United States Patent
Yoo et al.

(10) Patent No.: US 7,030,954 B2
(45) Date of Patent: Apr. 18, 2006

(54) IN-PLANE SWITCHING LCD PANEL

(75) Inventors: Jang-Jin Yoo, Seoul (KR); Hyung-Ki Hong, Seoul (KR); Ki-Hyuk Yoon, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/893,231

(22) Filed: Jul. 19, 2004

(65) Prior Publication Data

US 2004/0257512 A1 Dec. 23, 2004

Related U.S. Application Data

(62) Division of application No. 09/836,351, filed on Apr. 18, 2001, now Pat. No. 6,803,979.

(30) Foreign Application Priority Data

Apr. 19, 2000 (KR) .............................. 2000-20723
Sep. 8, 2000 (KR) .............................. 2000-53614

(51) Int. Cl.
*G02F 1/1343* (2006.01)
*G02F 1/1333* (2006.01)

(52) U.S. Cl. ..................................... 349/141; 349/138

(58) Field of Classification Search ........ 349/141–143, 349/138–139
See application file for complete search history.

(56) References Cited

U.S. PATENT DOCUMENTS

| 5,946,066 A | 8/1999 | Lee et al. .................... 349/141 |
| 6,088,078 A | 7/2000 | Kim et al. .................... 349/141 |
| 6,259,503 B1 * | 7/2001 | Watanabe et al. ........... 349/141 |
| 6,335,780 B1 * | 1/2002 | Kurihara et al. ............ 349/156 |
| 6,710,837 B1 * | 3/2004 | Song et al. .................. 349/143 |

FOREIGN PATENT DOCUMENTS

KR P1999-017651 3/1999

* cited by examiner

*Primary Examiner*—Dung T. Nguyen
(74) *Attorney, Agent, or Firm*—McKenna Long & Aldridge LLP

(57) ABSTRACT

The present invention discloses an IPS-LCD device. The IPS-LCD device according to the present invention implements a multi-domain for a liquid crystal layer. The liquid crystal molecules are aligned in various directions with respect to each different domain. Therefore, the different domains compensate for one another such that a color shift is prevented in spite of wide viewing angles. To form the multi-domain, the present invention provides a plurality of dielectric protrusions.

24 Claims, 14 Drawing Sheets

IN-PLANE SWITCHING LCD PANEL

CROSS-REFERENCE TO RELATED APPLICATIONS

This application is a divisional application of U.S. patent application Ser. No. 09/836,351 filed Apr. 18, 2001, now U.S. Pat. No. 6,803,979; which claims priority to Korean Patent Application No.: 2000-20723, filed Apr. 19, 2000, and Korean Patent Application No. 2000-53614, filed Sep. 8, 2000, each of which is incorporated by reference for all purposes as if fully set forth herein.

BACKGROUND OF THE INVENTION

1. Field of the Invention

The present invention relates to a liquid crystal display device, and more particularly to a liquid crystal display device implementing in-plane switching (IPS) where an electric field to be applied to liquid crystal is generated in a plane parallel to a substrate.

2. Discussion of the Related Art

A typical liquid crystal display (LCD) device uses optical anisotropy and polarization properties of liquid crystal molecules. The liquid crystal molecules have a definite orientational order in alignment resulting from their thin and long shapes. The alignment orientation of the liquid crystal molecules can be controlled by supplying an electric field to the liquid crystal molecules. In other words, as the alignment direction of the electric field is changed, the alignment of the liquid crystal molecules also changes. Because incident light is refracted to the orientation of the liquid crystal molecules due to the optical anisotropy of the aligned liquid crystal molecules, image data is displayed.

A liquid crystal is classified into a positive liquid crystal and a negative liquid crystal, in view of electrical property. The positive liquid crystal has a positive dielectric anisotropy such that long axes of liquid crystal molecules are aligned parallel to an electric field. Whereas, the negative liquid crystal has a negative dielectric anisotropy such that long axes of liquid crystal molecules are aligned perpendicular to an electric field.

By now, an active matrix LCD that the thin film transistors and the pixel electrodes are arranged in the form of a matrix is most attention-getting due to its high resolution and superiority in displaying moving video data.

FIG. 1 is a cross-sectional view illustrating a typical twisted nematic (TN) LCD panel. As shown in FIG. 1, the TN-LCD panel has lower and upper substrates 2 and 4 and an interposed liquid crystal layer 10. The lower substrate 2 includes a first transparent substrate 1a and a thin film transistor ("TFT") "S". The TFT "S" is used as a switching element to change orientation of the liquid crystal molecules. The lower substrate 2 further includes a pixel electrode 15 that applies an electric field to the liquid crystal layer 10 in accordance with signals applied by the TFT "S". The upper substrate 4 has a second transparent substrate 1b, a color filter 8 on the second transparent substrate 4, and a common electrode 14 on the color filter 8. The color filter 8 implements color for the LCD panel. The common electrode 14 serves as another electrode for applying a voltage to the liquid crystal layer 10. The pixel electrode 15 is arranged over a pixel portion "P," i.e., a display area. Further, to prevent leakage of the liquid crystal layer 10 between the lower and upper substrates 2 and 4, those substrates are sealed by a sealant 6.

As described above, because the pixel and common electrodes 15 and 14 of the conventional TN-LCD panel are positioned on the lower and upper substrates 2 and 4, respectively, the electric field induced therebetween is perpendicular to the lower and upper substrates 1a and 1b. The above-mentioned liquid crystal display device has advantages of high transmittance and aperture ratio, and further, since the common electrode on the upper substrate serves as an electrical ground, the liquid crystal is protected from a static electricity.

FIGS. 2A and 2B show different alignments of the positive TN liquid crystal molecules 10, respectively, without and with an electric field (off and on states). In FIG. 2A, various arrows show the gradual rotating of the liquid crystal molecules 10 with polar angles 0 to 90 degrees, which are measured on a plane parallel to the lower and upper substrate 2 and 4. At the same time, the liquid crystal molecules 10 are gradually rotated to 90 degrees from the lower substrate 2 to the upper substrate 4. That is to say, the long axes of the liquid crystal molecules 10 gradually rotate along a helical axis (not shown) that is perpendicular to the lower and upper substrates 2 and 4. First and second polarizers 18 and 30 are positioned on the exterior surfaces of the lower and upper substrate 2 and 4, respectively. At this point, the broken lines on the first and second polarizers 18 and 30 correspond to first and second transmittance axis of the first and second polarizers 18 and 30, respectively. After rays of light travel through a TN liquid crystal panel in the off state, as discussed above, they are linearly polarized and rotated 90 degrees.

As shown in FIG. 2B, when there is an electric field "E" applied to the positive TN liquid crystal molecules 10, the liquid crystal molecules are aligned perpendicular to the upper and lower substrates 4 and 2. That is to say, with the electric field E applied across the liquid crystal molecules 10, the liquid crystal molecules 10 rotate to be parallel to the electric field "E". In this case, the rotation of the linearly polarized light does not take place. Therefore, light is blocked by the second polarizers 30 after it travels through the first polarizer 18.

However, the above-mentioned operation mode of the TN-LCD panel has a disadvantage of a narrow viewing angle. That is to say, the TN liquid crystal molecules rotate with polar angles 0 to 90 degrees, which are too wide. Because of the large rotating angle, contrast ratio and brightness of the TN-LCD panel fluctuate rapidly with respect to the viewing angles.

To overcome the above-mentioned problem, an in-plane switching (IPS) LCD panel was developed. The IPS-LCD panel implements a parallel electric field that is parallel to the substrates, which is different from the TN or STN (super twisted nematic) LCD panel. A detailed explanation about operation modes of a typical IPS-LCD panel will be provided with reference to FIGS. 3, 4A, and 4B.

As shown in FIG. 3, first and second substrates 1a and 1b are spaced apart from each other, and a liquid crystal "LC" is interposed therebetween. The first and second substrates 1a and 1b are called an array substrate and a color filter substrate, respectively. Pixel and common electrodes 15 and 14 are disposed on the first substrate 1a. The pixel and common electrodes 15 and 14 are parallel with and spaced apart from each other. On a surface of the second substrate 1b, a color filter 25 is disposed opposing the first substrate 1a. The pixel and common electrodes 15 and 14 apply an electric field "E" to the liquid crystal "LC". The liquid crystal "LC" has a negative dielectric anisotropy, and thus it is aligned parallel to the electric field "E".

FIGS. 4A and 4B conceptually illustrate operation modes for a typical IPS-LCD device. In an off state, the long axes of the LC molecules "LC" maintain a definite angle with respect to a line that is perpendicular to the pixel and common electrodes 15 and 14. The pixel and common electrode 15 and 14 are parallel with each other. Herein, the angle difference is 45 degrees, for example.

In an on state, an in-plane electric field "E", which is parallel with the surface of the first substrate 1a, is generated between the pixel and common electrodes 15 and 14. The reason is that the pixel electrode 15 and common electrode 14 are formed together on the first substrate 1a. Then, the LC molecules "LC" are twisted such that the long axes thereof coincide with the electric field direction. Thereby, the LC molecules "LC" are aligned such that the long axes thereof are perpendicular to the pixel and common electrodes 15 and 14.

In the above-mentioned IPS-LCD panel, there is no transparent electrode on the color filter, and the liquid crystal used in the IPS-LCD panel includes a negative dielectric anisotropy.

FIGS. 5A and 5B are conceptual plane views illustrating alignment of the liquid crystal molecules of the above-mentioned IPS-LCD panel, respectively, in off and on states. As shown in FIG. 5A, each liquid crystal molecule 10 is aligned in a proper direction by a pair of alignment layers (not shown), which are formed on opposing surfaces of the first and second substrate 1a and 1b. As shown in FIG. 5B, the electric field "E" is applied between the pixel and common electrodes 15 and 14 such that each molecule 10 is aligned in accordance with the electric field "E". That is to say, each liquid crystal molecule 10 rotates to a definite angle in accordance with the electric field "E".

Compared with the TN-LCD device of FIG. 1, the IPS-LCD device has a wider viewing angle owing to a smaller rotating angle of the liquid crystal molecules.

The IPS-LCD device has the advantage of a wide viewing angle. Namely, when a user looks at the IPS-LCD device in a top view, the wide viewing angle of about 70 degrees is achieved in up, down, right and left directions.

By the above-mentioned operation modes and with additional elements such as polarizers and alignment layers, the IPS-LCD device displays images. The IPS-LCD device has a wide viewing angle, low color dispersion qualities, and the fabricating processes thereof are simpler among those of various LCD devices.

However, because the pixel and common electrodes are disposed on the same plane on the lower substrate, the transmittance and aperture ratio are low. In addition, a response time according to a driving voltage should be improved, and a color's dependence on the viewing angle should be decreased.

FIG. 6 is a graph of the CIE (Commission Internationale de l'Eclairage) color coordinates and shows the color dispersion property of the conventional IPS-LCD device. The horseshoe-shaped area is the distribution range of the wavelength of visible light. The results are measured using point (0.313, 0.329) in CIE coordinate as a standard white light source and with various viewing angles of right, left, up and down, and 45 and 135 degrees. Obviously, the range of the color dispersion is so long, which means that the white light emitted from the conventional IPS-LCD device is dispersed largely according to the viewing angle. This results from the fact that the operation mode of the IPS-LCD device is controlled by birefringence. S. Endow et al. indicated the above-mentioned problem in their paper "Advanced 18.1-inch Diagonal Super-TFT-LCDs with Mega Wide Viewing Angle and Fast Response Speed of 20 ms: IDW 99' 187 page".

FIG. 7 is a graph illustrating transmittance with respect to viewing angles for first to eighth gray levels (gray scale) of a conventional IPS-LCD device. Except for the first gray level, "level 1," each gray level has the highest transmittance at a viewing angle of 0 degree. The first gray level, "level 1," has gray inversion regions. When the viewing angle is beyond 60 degrees, the first gray level, "level 1," has the higher transmittance than the fourth gray level, "level 4." The first gray level, "level 1," should implement a black state of the LCD panel. However, gray inversion occurs at viewing angles larger than 60 degrees, such that a white state, but not a black state, is produced at the larger viewing angles. The above-mentioned gray inversion results from a birefringence dependence of the IPS-LCD device and causes a poor display quality of the IPS-LCD device.

FIG. 8 shows an example of the IPS-LCD device according to the related art. As shown in FIG. 8, zigzag-shaped pixel electrodes 35 and zigzag-shaped common electrodes 34 are alternately arranged such that first and second electric fields 46a and 46b are alternately induced along the zigzag-shaped electrodes. The first and second electric fields 46a and 46b have different directions. Therefore, a multi-domain is achieved owing to the first and second electric fields 46a and 46b. An alignment layer (not shown) is also used for a first state alignment of liquid crystal molecules (reference 10 of FIG. 3). The alignment layer (not shown) beneficially has one rubbing direction 44.

The above-mentioned zigzag-shaped common and pixel electrodes 34 and 35 minimize the color shift. However, between bending portions "D" of the common and pixel electrodes 34 and 35, an electric field is induced perpendicular to the rubbing direction 44. That is to say, long axes of the liquid crystal molecules are perpendicular to the electric field induced between the bending portions "D." Then, the liquid crystal molecules cannot rotate, but keep the first state alignment such that an abnormal alignment is present at each boundary portion "C" between the different domains.

The abnormal alignment at the boundary portion "C" causes a light leak such that white lines are shown on a display area, the pixel region "P" shown in FIG. 1, of the LCD device. The above-mentioned white lines are called a disclination. A black matrix may be expanded to the pixel regions to cover the disclination. However, the expanded black matrix causes a low aperture ratio.

Now, with reference to FIGS. 9A and 9B, effect of the multi-domain is explained in detail. A liquid crystal layer generally has a birefringence, because each liquid crystal molecule has a long and thin shape. The birefringence changes with respect to a viewing angle. FIG. 9A is a cross-sectional view illustrating a single-domain for a liquid crystal molecule 10 between upper and lower polarizers 30 and 18. At this point, the birefringence of the liquid crystal molecule 10 involves different values for the first, second, and third position "a", "b", and "c", which involve different viewing angles. Therefore, the birefringence of the liquid crystal molecule 10 cannot be zero with respect to viewing angles. If the birefringence of the liquid crystal layer is not zero, the perfect black state cannot be achieved between the upper and lower polarizers 30 and 18.

To overcome the above-mentioned problem, the multi-domain shown in FIG. 9B is adopted for a LCD device. As shown, there are first and second liquid crystal molecules 10a and 10b arranged opposite to each other. The birefringence of the first liquid crystal molecule 10a involves different values for the first, second, and third position "$a_1$", "$b_1$", and "$c_1$." Whereas, the birefringence of the second liquid crystal molecule 10b involves different values for the fourth, fifth, and sixth position "$a_2$", "$b_2$", and "$c_2$." The first and fourth positions "$a_1$" and "$a_2$" involve the same viewing angle. Because the first and second liquid crystal molecules 10a and 10b are symmetrically opposed with each other, birefringence of the first liquid crystal molecule 10a at the first position "$a_1$" is compensated by that of the second liquid crystal molecule 10b at the fourth position "$a_2$." That is to say, each birefringence of the first liquid crystal molecule 10a is compensated by corresponding birefringence of the second liquid crystal molecule 10b. In other words, sum of the birefringence between the first and second liquid crystal molecules 10a and 10b is about zero. Accordingly, the multi-domain shown in FIG. 9B improves the display quality of the LCD device.

SUMMARY OF THE INVENTION

Accordingly, the present invention is directed to an IPS-LCD device that substantially obviates one or more of the problems due to limitations and disadvantages of the related art.

An object of the present invention is to provide an IPS-LCD device having low color dispersion and low white inversion with respect to viewing angles.

Another object of the present invention is to provide an IPS-LCD device having optimized common and pixel electrodes such that high aperture ratio, low color shift, and fast response time are achieved.

Additional features and advantages of the invention will be set forth in the description which follows, and in part will be apparent from the description or may be learned by practice of the invention. The objectives and other advantages of the invention will be realized and attained by the structure particularly pointed out in the written description and claims hereof as well as the appended drawings.

In order to achieve the above object, the present invention provides an IPS-LCD device, which includes: first and second substrates opposing each other; a gate line on the first substrate; a data line perpendicular to the gate line; a thin film transistor at a crossing portion between the gate and data lines; a common line parallel to the gate line; a plurality of common electrodes electrically connected to the common line, wherein the common electrodes are spaced apart from each other; a plurality of pixel electrodes alternately arranged with the plurality of common electrodes, wherein each pixel electrode is spaced apart from an adjacent common electrode; a plurality of dielectric protrusions between the first and second substrates; and a liquid crystal layer between the first and second substrates, wherein the liquid crystal layer and the dielectric protrusion have different dielectric constants.

The dielectric protrusion has a smaller or larger dielectric constant than the liquid crystal layer.

The dielectric protrusion is an organic material, which is preferably selected from a group consisting of photoresist, benzocyclobutene (BCB), and acryl resin.

A plurality of first dielectric protrusions are disposed over a plurality of pixel electrodes. A plurality of second dielectric protrusions are disposed over a plurality of common electrodes. The plurality of first and second protrusions are formed on the first substrate having the pixel electrodes, or the plurality of first and second protrusions are formed on the second substrate.

The dielectric protrusion is a chevron-shaped dielectric protrusion, and the chevron-shaped dielectric protrusion has a zigzag shape extending along a line perpendicular to the common and pixel electrodes.

The pixel electrode is selected from a group consisting of indium tin oxide (ITO) and indium zinc oxide (IZO). The common electrode is selected from a group consisting of chromium (Cr), aluminum (Al), aluminum alloy (Al alloy), molybdenum (Mo), tantalum (Ta), tungsten (W), antimony (Sb), and an alloy thereof. The common electrode is further selected from a group consisting of indium tin oxide (ITO) and indium zinc oxide (IZO).

The liquid crystal layer is a positive liquid crystal having a positive dielectric anisotropy, and long axes of liquid crystal molecules are aligned parallel to the common and pixel electrodes in off state. In another aspect, the liquid crystal layer is a negative liquid crystal having a negative dielectric anisotropy, and long axes of liquid crystal molecules are aligned perpendicular to the common and pixel electrodes in an off state.

In another aspect, the present invention provides an in-plane-switching liquid crystal display panel, which includes: first and second substrates opposing each other; a gate line on the substrate; a data line perpendicular to the gate line; a thin film transistor at a crossing portion between the gate and data lines; a main common line parallel to the gate line; first and second auxiliary common lines perpendicular to the main common line, the first and second auxiliary common lines being parallel to and spaced apart from each other; a plurality of common electrodes electrically connected to the common line, wherein the common electrodes are spaced apart from each other; a plurality of pixel electrodes alternately arranged with the plurality of common electrodes, wherein each pixel electrode is spaced apart from an adjacent common electrode; a plurality of dielectric protrusions between the first and second substrates; and a liquid crystal layer between the first and second substrates.

The dielectric protrusion has a smaller or larger dielectric constant than the liquid crystal layer.

The dielectric protrusion is an organic material, which is preferably selected from a group consisting of photoresist, benzocyclobutene (BCB), and acryl resin.

A plurality of first dielectric protrusions are disposed over a plurality of pixel electrodes. A plurality of second dielectric protrusions are disposed over a plurality of common electrodes. The plurality of first and second protrusions are formed on the first substrate having the pixel electrodes, or the plurality of first and second protrusions are formed on the second substrate.

The dielectric protrusion is a chevron-shaped dielectric protrusion, and the chevron-shaped dielectric protrusion has a zigzag shape extending along a line perpendicular to the common and pixel electrodes.

The pixel electrode is selected from a group consisting of indium tin oxide (ITO) and indium zinc oxide (IZO). The common electrode is selected from a group consisting of chromium (Cr), aluminum (Al), aluminum alloy (Al alloy), molybdenum (Mo), tantalum (Ta), tungsten (W), antimony (Sb), and an alloy thereof. The common electrode is further selected from a group consisting of indium tin oxide (ITO) and indium zinc oxide (IZO).

The liquid crystal layer is a positive liquid crystal having a positive dielectric anisotropy, and long axes of liquid crystal molecules are aligned parallel to the common and pixel electrodes in off state. In another aspect, the liquid crystal layer is a negative liquid crystal having a negative dielectric anisotropy, and long axes of liquid crystal molecules are aligned perpendicular to the common and pixel electrodes in an off state.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

First Preferred Embodiment

Figure 10:
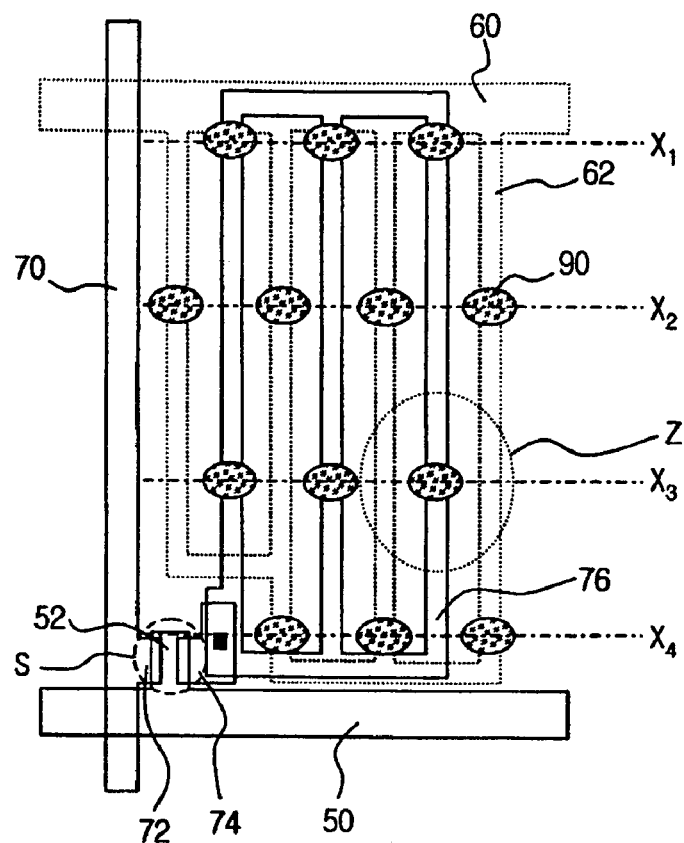
FIG. 10 is a plan view illustrating an IPS-LCD device according to the first preferred embodiment of the present invention.

FIG. 10 is a plan view illustrating an IPS-LCD device according to the first preferred embodiment. As shown, a gate line 50 and a common line 60 are transversely arranged, and a data line 70 is formed perpendicular to the gate and common lines. A plurality of pixel electrodes 76 are formed perpendicular to the gate and common lines 50 and 60. At a crossing point between the gate and data lines 50 and 70, a gate electrode 52 and a source electrode 72 are integrally formed with the gate and data lines 50 and 70, respectively. In addition, a drain electrode 74 is spaced apart from the source electrode 72. The gate, source, and drain electrodes 52, 72, and 74 are included in a thin film transistor ("TFT") "S". The pixel electrodes 76 are electrically connected with the drain electrode 74. The common line 60 includes a plurality of common electrodes 62. The plurality of common electrodes 62 are parallel to the pixel electrodes 76 and are alternately arranged with the plurality of pixel electrodes 76.

On the plurality of the pixel and common electrodes 76 and 62, a plurality of dielectric protrusions 90 are alternately-disposed. First to fourth reference lines "X1" to "X4" are drawn to specify a position of the dielectric protrusion 90. The first to fourth reference lines "X1" to "X4" are perpendicular to the common and pixel electrodes 62 and 76. The first to fourth reference lines "X1" to "X4" have the same interval between the adjacent ones. The dielectric protrusions 90 on the plurality of pixel electrodes 76 are disposed along the first and third reference lines "X1" and "X3". Meanwhile, the dielectric protrusions 90 on the plurality of common electrodes 62 are disposed along the second and fourth reference lines "X2" and "X4". The above-mentioned sequence of the dielectric protrusions 90 on the pixel and common electrodes 76 and 62 can be reversed without deterioration in operation property. That is to say, if the dielectric protrusions 90 on the plurality of pixel electrodes 76 are disposed along the second and fourth reference lines "X2" and "X4", the dielectric protrusions 90 on the plurality of common electrodes 62 are disposed along the first and third reference lines "X1" and "X3", and vice versa.

The dielectric protrusion 90 is made of a dielectric substance. Each dielectric protrusion 90 has a smaller dielectric constant than the liquid crystal (reference 80 of FIG. 11) has. The dielectric constant of the dielectric protrusion 90 is preferably below or equal to 5. Because of the smaller dielectric constant of the dielectric protrusion 90, an electric field applied between the pixel and common electrodes 76 and 62 has a relatively smaller intensity at the peripheries of the dielectric protrusions 90. In other words, each dielectric protrusion 90 serves to distort an electric field induced between the pixel and common electrodes 76 and 62.

Figure 11:
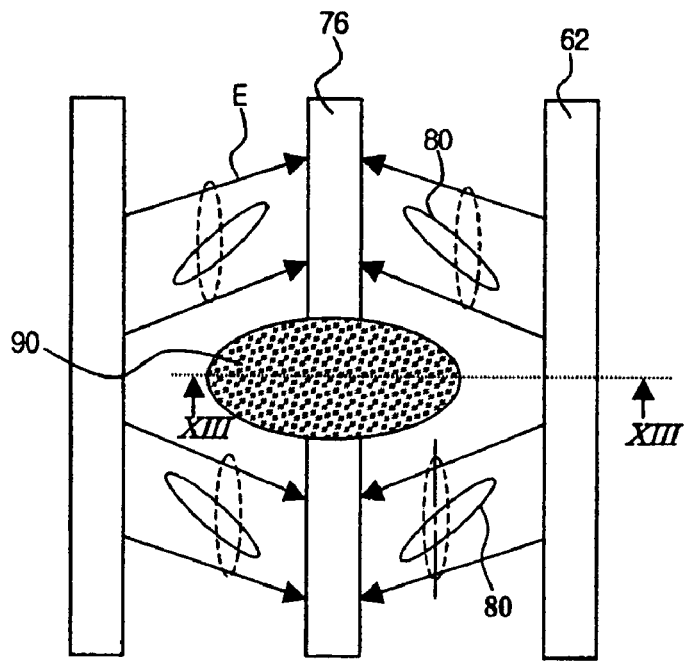
FIG. 11 is an expanded plan view of a portion "Z" of FIG. 12.

FIG. 11 shows an alignment of liquid crystal molecules 80 in detail. In an off state, long axes of the liquid crystal molecules 80 are uniformly aligned parallel to the common and pixel electrodes 62 and 76. However, when an electric field "E" is applied between the pixel and common electrodes 76 and 62, the liquid crystal molecules 80 are aligned in various directions such that a multi-domain is achieved.

That is to say, the electric field "E" is distorted by the dielectric protrusions 90 such that various angles are present between the first-aligned liquid crystal molecules 80 and the electric field. The liquid crystal molecules 80 rotate right or left depending on the directions of the distortion of the electric field "E" such that the multi-domain is formed.

In other words, the liquid crystal molecules 80 are at first aligned parallel to the common and pixel electrodes 62 and 76. When the electric field "E" is applied and distorted to be at various angles with the liquid crystal molecules 80, each liquid crystal molecule 80 rotates to a smaller angled direction between the long axes of the liquid crystal molecules and the electric field "E". The smaller angled direction is clockwise or counterclockwise depending on a relative position of a liquid crystal molecule 80 with respect to the dielectric protrusion 90. That is to say, a first portion of the liquid crystal molecules 80 rotates right and a second portion thereof rotates left such that the multi-domain is symmetrically formed.

Preferably, the liquid crystal molecules 80 are a positive liquid crystal having positive dielectric anisotropy. In addition, in the off state, the long axes of the liquid crystal molecules 80 are preferably aligned parallel to the common and pixel electrodes 62 and 76. That is to say, a rubbing direction of an alignment layer (not shown) for the liquid crystal molecules 80 is preferably parallel to the common and pixel electrodes 62 and 76.

Figure 12:
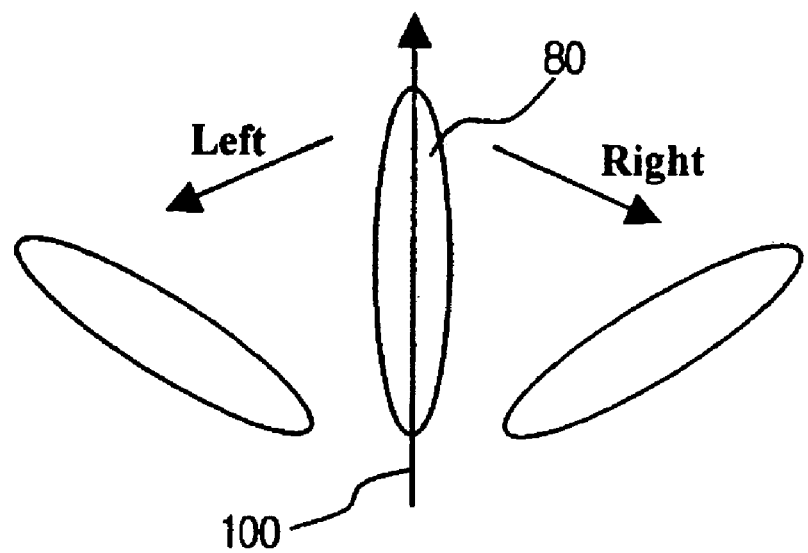
FIG. 12 is a plan view illustrating a degree of freedom for a liquid crystal molecule according to the preferred embodiment.

FIG. 12 shows the degree of freedom for liquid crystal molecule 80 with respect to a rubbing direction 100. In a first state alignment (off state), the liquid crystal molecule 80 is aligned corresponding to the rubbing direction 100, which is preferably parallel to the common and pixel electrodes 62 and 76 of FIG. 11. As shown in FIG. 12, the liquid crystal molecule 80 can rotate right or left, which means that the degree of freedom of the liquid crystal molecule 80 is two. The liquid crystal molecules 80 may be a negative liquid crystal instead of the positive liquid crystal. In that case, the rubbing direction 100 is preferably perpendicular to the common electrodes 62 and pixel electrodes 76.

Figure 1:
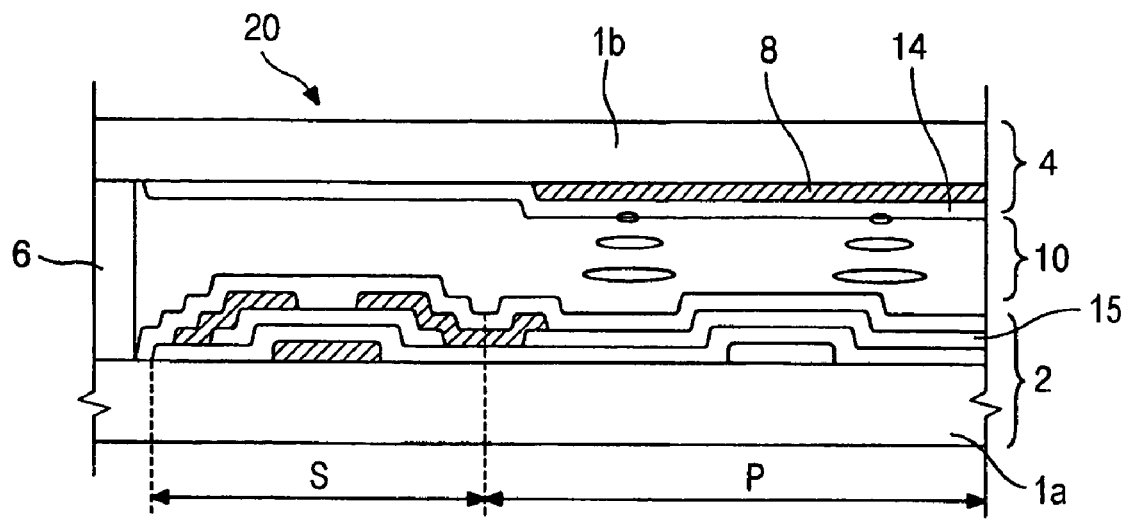
FIG. 1 is a cross-sectional view illustrating a typical liquid crystal display device.
Figure 2A:
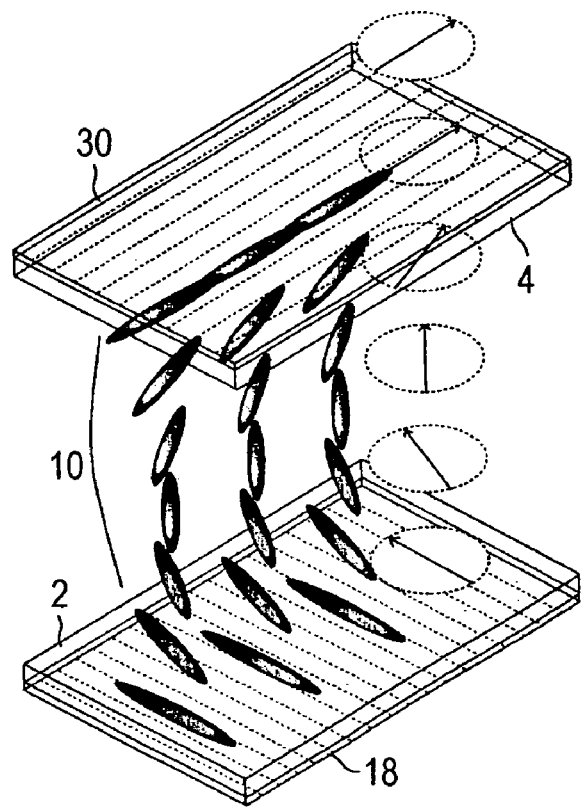
FIGS. 2A and 2B illustrate operation modes of a typical TN-LCD panel.
Figure 2B:
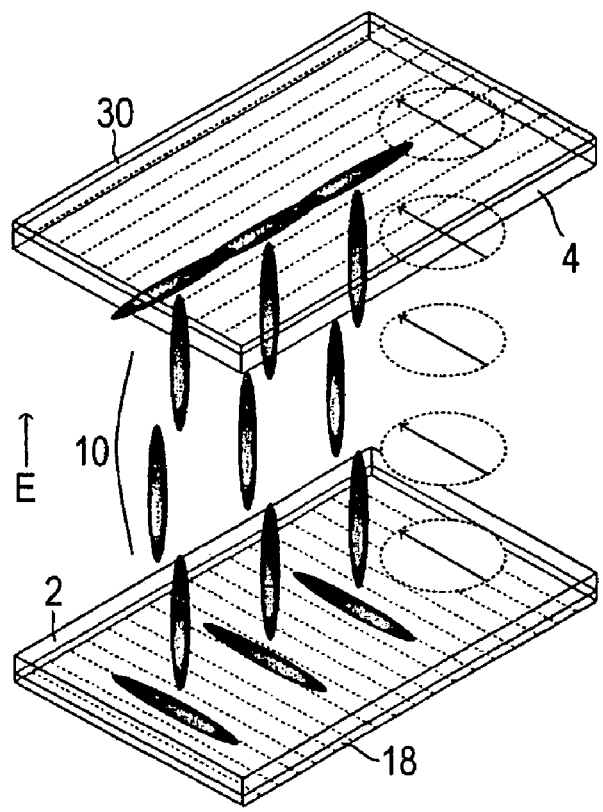
Figure 3:
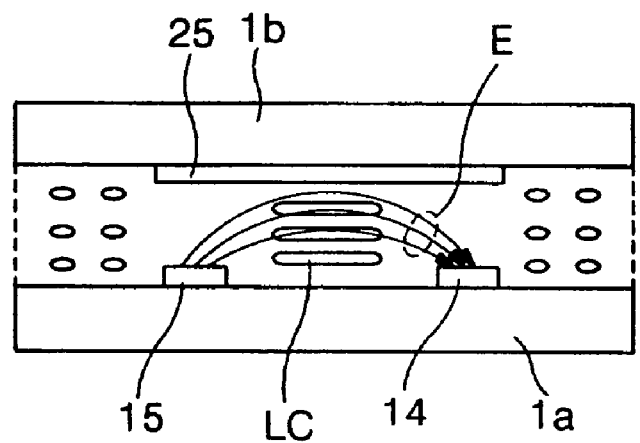
FIG. 3 is a cross-sectional view illustrating a typical IPS-LCD device.
Figure 4A:
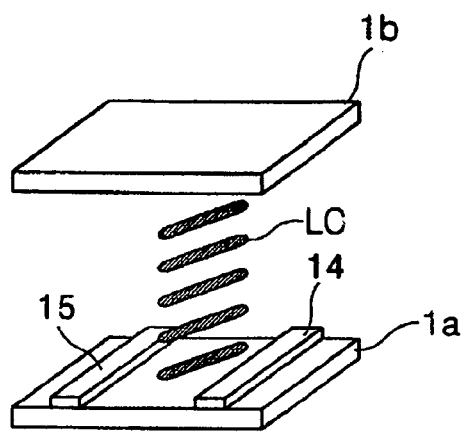
FIGS. 4A and 4B are perspective views illustrating operation modes of the typical IPS-LCD device of FIG. 3.
Figure 4B:
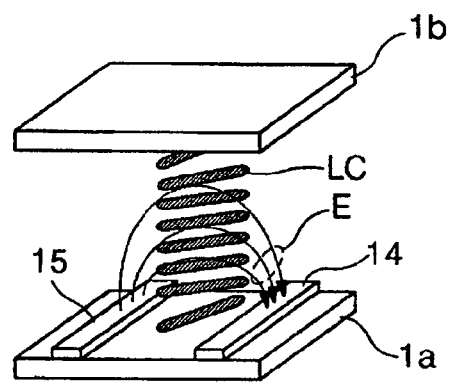
Figure 5A:
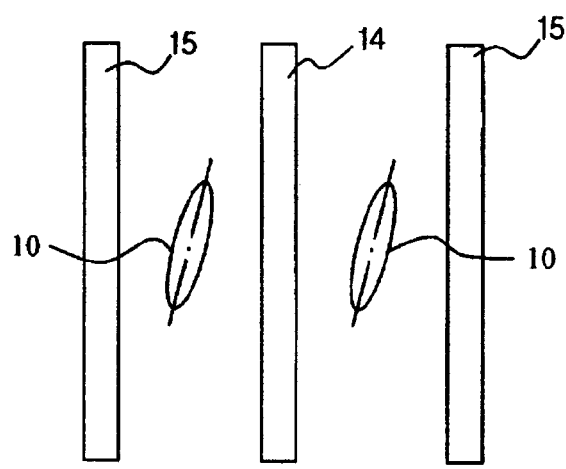
FIG. 5A and 5B are plan views illustrating, respectively, off state alignment and on state alignment of liquid crystal molecules of the IPS-LCD device shown in FIG. 3.
Figure 5B:
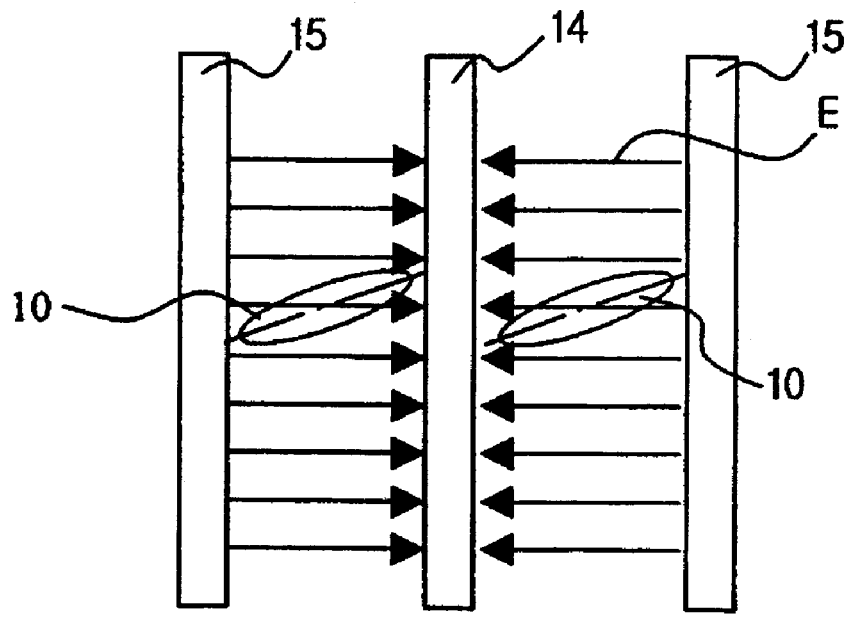
Figure 6:
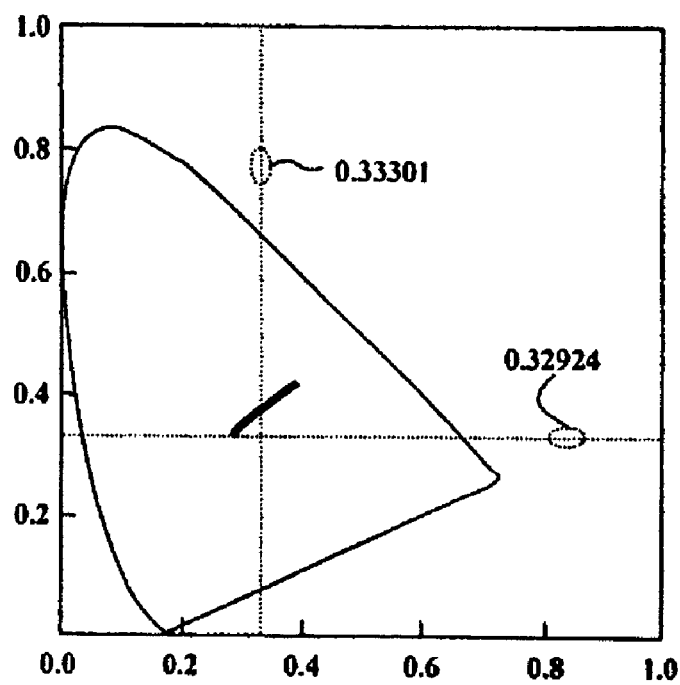
FIG. 6 is a CIE graph illustrating a color coordinate property with respect to various viewing angles of the typical IPS-LCD device.
Figure 7:
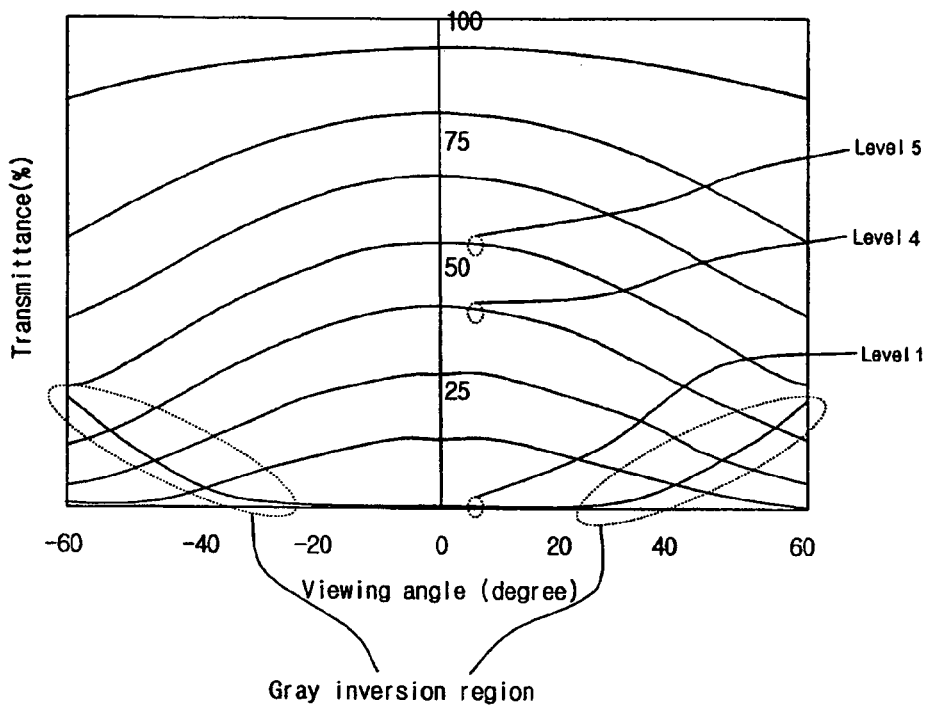
FIG. 7 is a graph illustrating transmittance with respect to viewing angles for first to eighth gray levels of the typical IPS-LCD device.
Figure 8:
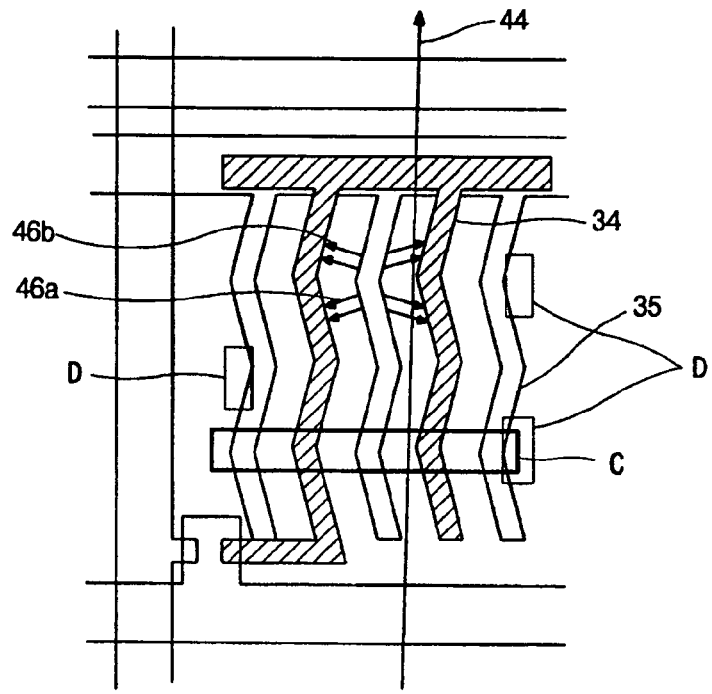
FIG. 8 is a plan view illustrating an example for an IPS-LCD device according to the related art.
Figure 9A:
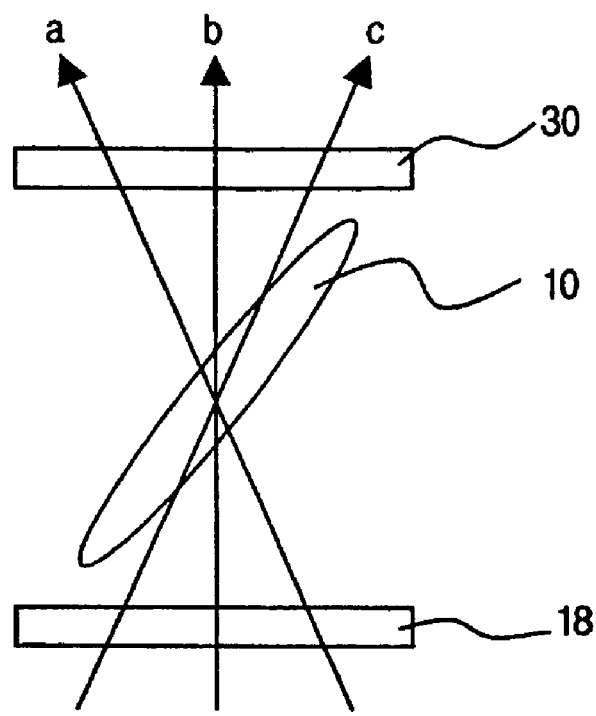
FIGS. 9A and 9B are cross-sectional views illustrating, respectively, single-domain and multi-domain for liquid crystal molecules.
Figure 9B:
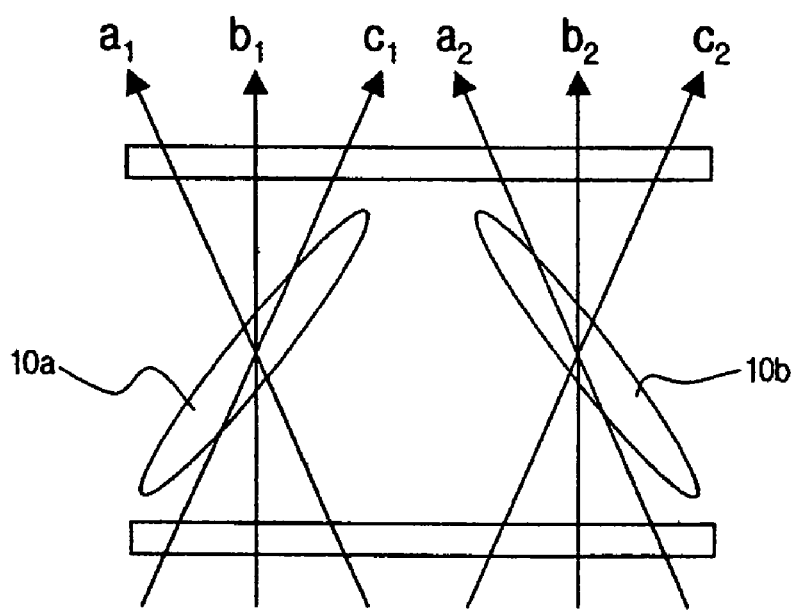

The above-mentioned multi-domain decreases a color's dependence on viewing angles such that a gray inversion shown in FIG. 7 is prevented.

Figure 13:
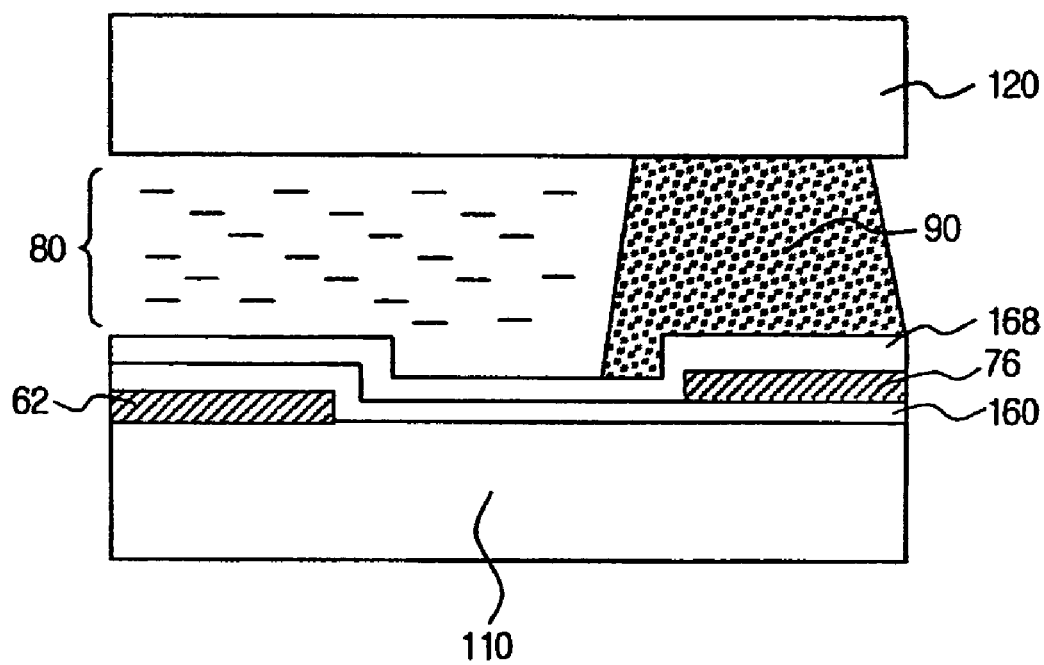
FIG. 13 is a partial cross-sectional view illustrating a dielectric protrusion of the first preferred embodiment.

Now, with reference to FIG. 13, a preferable structure of the above-mentioned dielectric protrusion 90 is provided. FIG. 13 is a cross-sectional view taken along a line "XIII—XIII" of FIG. 11. As shown in FIG. 13, the dielectric protrusion 90 is disposed over the pixel electrode 76 or common electrode 62 and directly faces or abuts the liquid crystal molecules 80. The dielectric protrusion 90 is preferably made of an organic substance, usually photoresist, benzocyclobutene (BCB), and acryl resin. The common electrodes 62 is covered by a gate-insulating layer 160, whereas the pixel electrode 76 is covered by a passivation layer 168. The dielectric protrusion 90 further may serve as a spacer to maintain a cell gap between first and second substrates 110 and 120.

The pixel electrode 76 is preferably made from a transparent conductive material, usually indium tin oxide (ITO) and indium zinc oxide (IZO), which have a high transmittance. Meanwhile, the common electrode 62 is usually made of the same material as the gate line 50, and the transparent conductive material is also preferably used for the common electrode 62 to achieve a higher aperture ratio. The gate and data lines 50 and 70 are preferably selected from a group consisting of chromium (Cr), aluminum (Al), aluminum alloy (Al alloy), molybdenum (Mo), tantalum (Ta), tungsten (W), antimony (Sb), and an alloy thereof.

For the first preferred embodiment, the plurality of dielectric protrusions 90 are alternately disposed over the common and pixel electrodes 62 and 76. However, the dielectric protrusions 90 may be disposed on any position in the pixel region, which is defined by the gate and data lines 50 and 70 of FIG. 11. For example, the dielectric protrusions 90 may be disposed between the common and pixel electrodes 62 and 76 to form the multi-domain.

Second Preferred Embodiment

Figure 14:
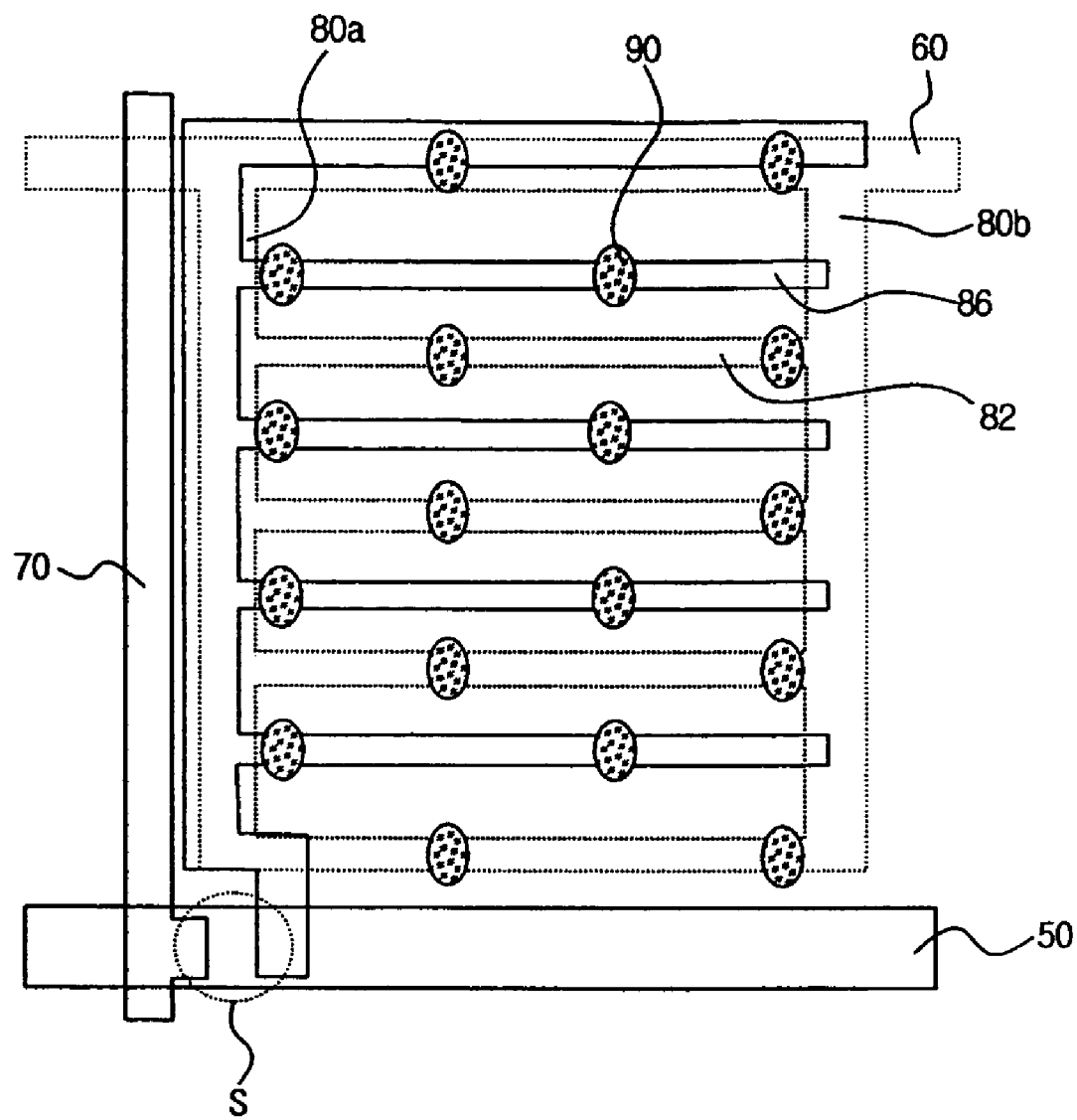
FIG. 14 is a plan view illustrating an IPS-LCD device according to the second preferred embodiment of the present invention.

FIG. 14 is a plan view illustrating an IPS-LCD device according to the second preferred embodiment. As shown in FIG. 14, a gate line 50 and a common line 60 are transversely arranged, and a data line 70 is formed perpendicular to the gate and common lines. A plurality of pixel electrodes 86 are formed parallel to the gate and common lines 50 and 60. At a crossing point between the gate and data lines 50 and 70, a thin film transistor ("TFT") "S" is disposed.

The common line 60 has first and second auxiliary common lines 88a and 88b, which are spaced apart from each other and perpendicular to the common line 60. In addition, a plurality of common electrodes 82 are formed perpendicular to the first and second auxiliary common lines 88a and 88b. The common electrodes 82 and pixel electrodes 86 are alternately arranged.

On the plurality of the pixel and common electrodes 86 and 82, a plurality of dielectric protrusions 90 are alternately disposed. The dielectric protrusion 90 is made of a dielectric substance. A positive liquid crystal (reference 80 of FIG. 12) is preferably used with a rubbing direction that is parallel to the common and pixel electrodes 82 and 86. If a negative liquid crystal is used for the second preferred embodiment, a rubbing direction that is perpendicular to the common and pixel electrodes 82 and 86 is employed for the second preferred embodiment. The dielectric protrusion 90 of the second preferred embodiment has the same structure and material as that of the first preferred embodiment.

The pixel electrode 86 is preferably made from a transparent conductive material, usually indium tin oxide (ITO) and indium zinc oxide (IZO), which have a high transmittance. Meanwhile, the common electrode 82 is usually made of the same material as the gate line 50, and the transparent conductive material is also preferably used for the common electrode 82 to achieve a higher aperture ratio.

For the second preferred embodiment, the plurality of dielectric protrusions 90 are alternately disposed over the common and pixel electrodes 82 and 86. However, the dielectric protrusions 90 may be disposed on any position in the pixel region defined by the gate and data lines 50 and 70 of FIG. 14. For example, the dielectric protrusions 90 may be disposed between the common and pixel electrodes 82 and 86 to form the multi-domain, or may be disposed only over the plurality of pixel electrodes 86 or common electrodes 82.

In addition, the dielectric protrusions 90 of the first and second preferred embodiment preferably have the smaller dielectric constant than the liquid crystal 80 (see FIG. 13). However, the dielectric protrusions 90 may have a larger dielectric constant than the liquid crystal 80. In that case, though an alignment of the liquid crystal molecules 80 is opposite to that of FIG. 11, a multi-domain is surely formed.

Third Preferred Embodiment

Figure 15:
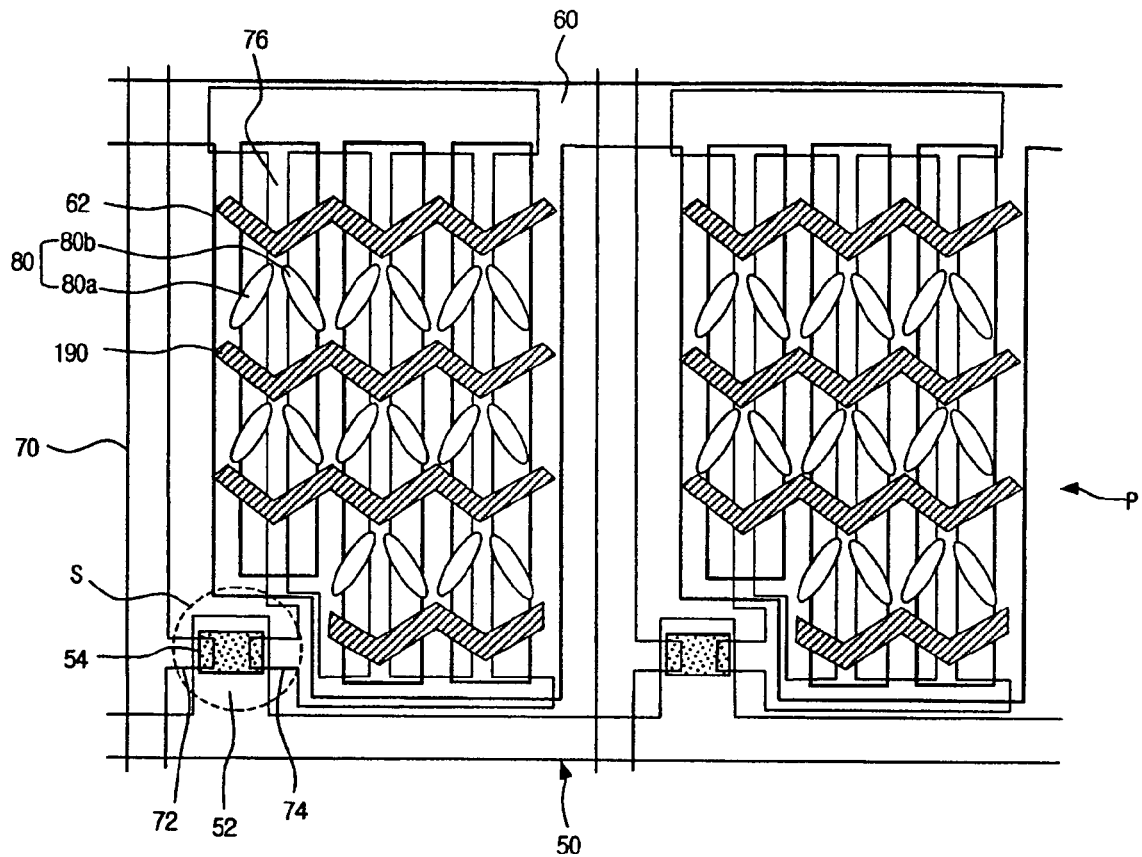
FIG. 15 is a plan view illustrating an IPS-LCD device according to the third preferred embodiment of the present invention.

FIG. 15 is a plan view illustrating an IPS-LCD device according to the third preferred embodiment. As shown, a gate line 50 and a common line 60 are transversely arranged, and a data line 70 is formed perpendicular to the gate and common lines on a pixel region "P." A plurality of pixel electrodes 76 are formed perpendicular to the gate and common lines 50 and 60. At a crossing point between the gate and data lines 50 and 70, a gate electrode 52 and a source electrode 72 are integrally formed with the gate and data lines 50 and 70, respectively. In addition, a drain electrode 74 is spaced apart from the source electrode 72, and an active layer 54 is disposed between the drain and source electrodes 74 and 72. The gate, source, and drain electrodes 52, 72, and 74, and the active layer 54 are included in a thin film transistor ("TFT") "S". The pixel electrodes 76 are electrically connected with the drain electrode 74. The common line 60 includes a plurality of common electrodes 62. The plurality of common electrodes 62 are parallel to the pixel electrodes 76 and are alternately arranged with the plurality of pixel electrodes 76.

Across the plurality of common and pixel electrodes 62 and 76, a plurality of chevron-shaped dielectric protrusions 190 are disposed. The plurality of chevron-shaped dielectric protrusions 190 are parallel to and spaced apart from each other. Each chevron-shaped dielectric protrusion 190 is alternately bent at each crossing point with the pixel electrode 76 or common electrode 62 to have a zigzag shape. The chevron-shaped dielectric protrusion 190 has a smaller dielectric constant than a liquid crystal 80 has. The dielectric constant of the dielectric protrusion 190 is preferably below or equal to 5. Because of the smaller dielectric constant of the chevron-shaped dielectric protrusions 90, an electric field applied between the pixel and common electrodes 76 and 62 has a relatively smaller intensity in periphery of the chevron-shaped dielectric protrusions 190.

In other words, each chevron-shaped dielectric protrusion 190 serves to distort an electric field induced between the pixel and common electrodes 76 and 62 such that a multi-domain for the liquid crystal molecules 80 is formed. That is to say, first and second liquid crystal portions 80a and 80b are symmetrically aligned with respect to the pixel electrode 76 or common electrode 62, which is centered therebetween.

Figure 16A:
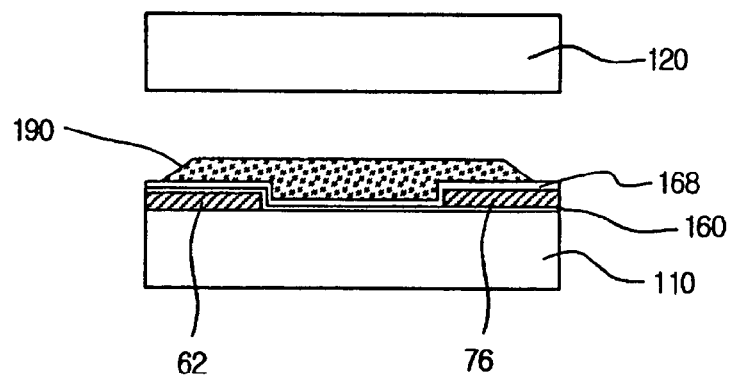
FIGS. 16A to 16C are partial cross-sectional views illustrating various structures for a dielectric protrusion of the third preferred embodiment.
Figure 16B:
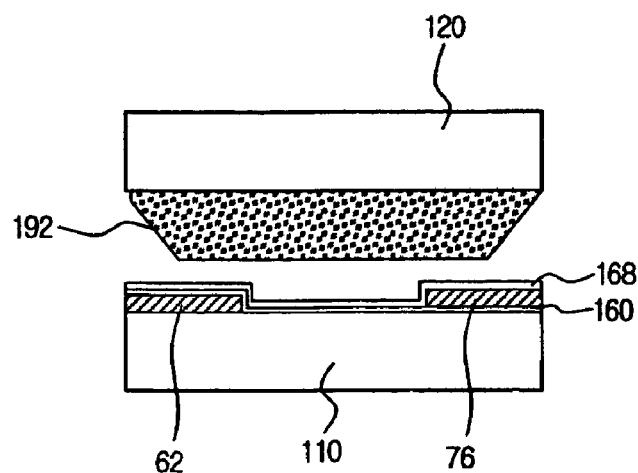
Figure 16C:
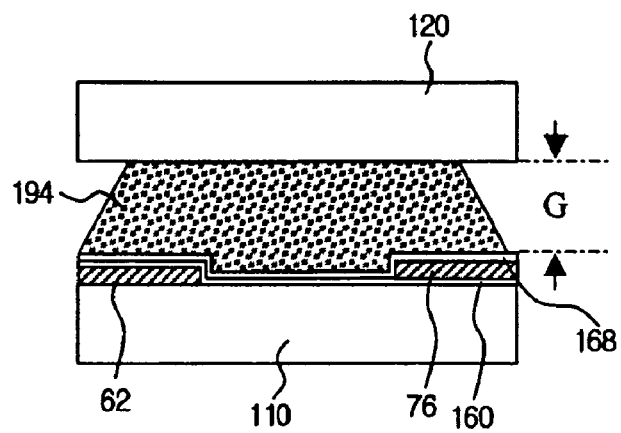

Now, with reference to FIGS. 16A to 16C, various structures for the chevron-shaped dielectric protrusion 190 are provided. As shown in FIG. 16A, the chevron-shaped dielectric protrusion 190 is preferably disposed over the common electrode 62 or pixel electrode 76 and directly faces the liquid crystal molecules 80 interposed between first and second substrates 110 and 120. The chevron-shaped dielectric protrusion 190 is preferably made of an organic substance, usually photoresist, benzocyclobutene (BCB), and acryl resin. The common electrodes 62 is covered by a gate-insulating layer 160, whereas the pixel electrode 76 is covered by a passivation layer 168.

FIG. 16B shows a first modification for the chevron-shaped dielectric protrusion. As shown, a chevron-shaped dielectric protrusion 192 is formed on an inner surface of the second substrate 120 instead of the first substrate 110 having the common and pixel electrodes 62 and 76.

FIG. 16C shows a second modification for the chevron-shaped dielectric protrusion. As shown, a chevron-shaped dielectric protrusion 194 is thick enough that a cell gap "G" is maintained between the first and second substrates 110 and 120. In this case, the chevron-shaped dielectric protrusion 194 may substitute for a spacer, which is used to maintain the cell gap "G".

Figure 17A:
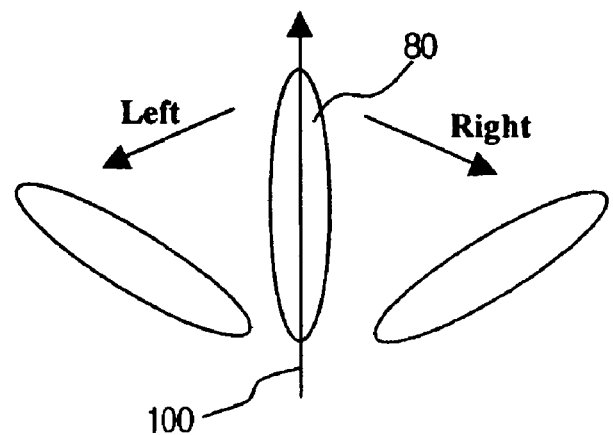
FIGS. 17A and 17B are plan views illustrating alignment characteristics of, respectively, a positive liquid crystal and a negative liquid crystal for the third preferred embodiment.

FIG. 17A shows a degree of freedom for liquid crystal molecule 80 with respect to a first rubbing direction 100. In a first state alignment (off state), the liquid crystal molecule 80 is aligned corresponding to the first rubbing direction 100, which is preferably parallel to the common and pixel electrodes 62 and 76 of FIG. 15. As shown, the liquid crystal molecule 80 can rotate right or left, which means that the degree of freedom of the liquid crystal molecule 80 is two.

Figure 17B:
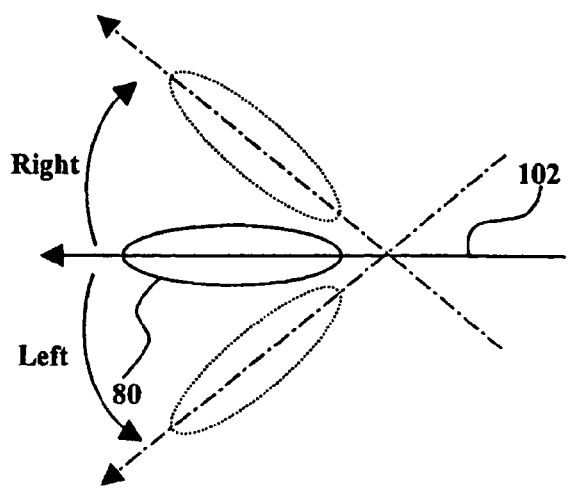

The liquid crystal molecules 80 may be a negative liquid crystal instead of the positive liquid crystal. In this case as shown in FIG. 17B, a second rubbing direction 102, which is perpendicular to the common electrodes 62 and pixel electrodes 76, is used instead of the first rubbing direction 100 of FIG. 17A. The right and left rotating liquid crystal molecules, respectively, are included in first and second domains of the multi-domain.

Fourth Preferred Embodiment

Figure 18:
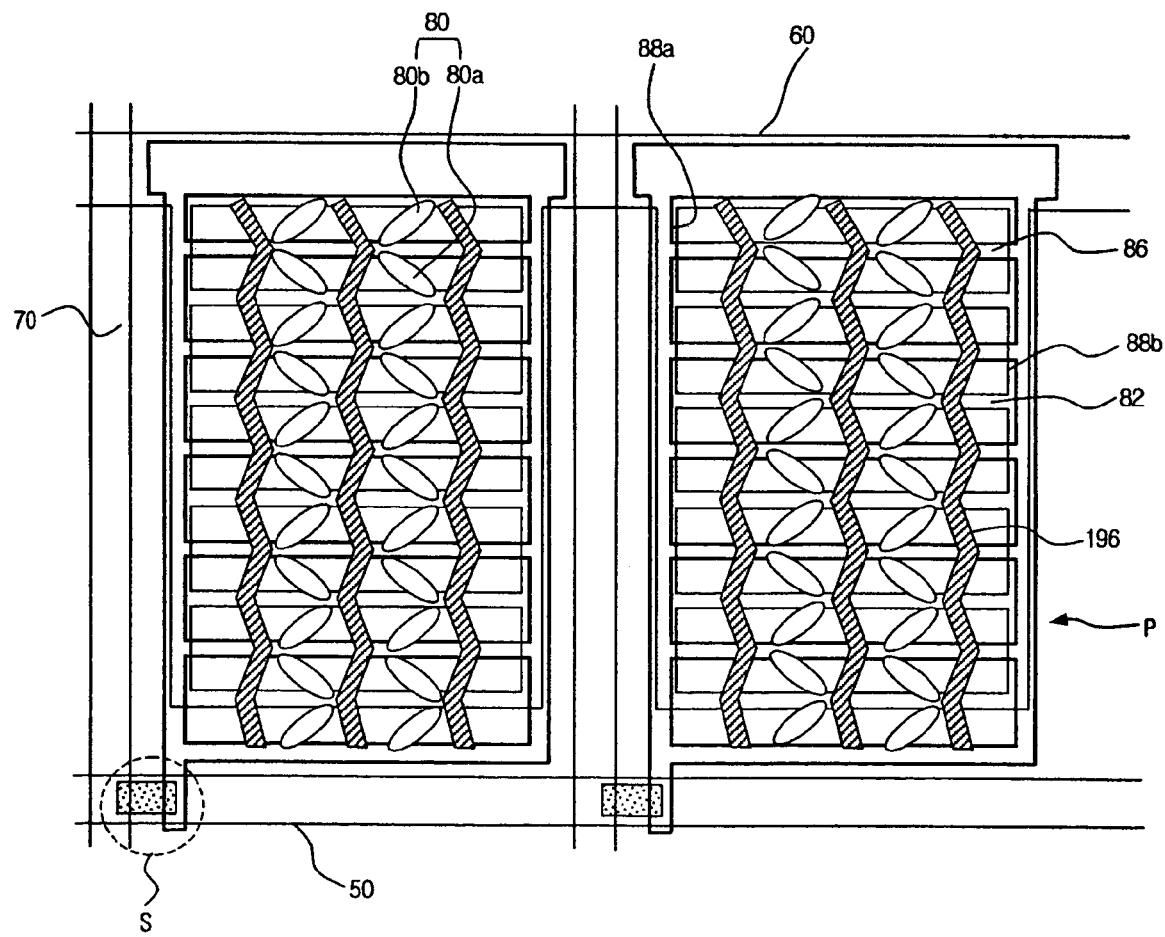
FIG. 18 is a plan view illustrating an IPS-LCD device according to the fourth preferred embodiment of the present invention.

FIG. 18 is a plan view illustrating an IPS-LCD device according to the fourth preferred embodiment. As shown, a gate line 50 and a common line 60 are transversely arranged, and a data line 70 is formed perpendicular to the gate and common lines on a pixel region "P." A plurality of pixel electrodes 86 are formed parallel to the gate and common lines 50 and 60. At a crossing point between the gate and data lines 50 and 70, a thin film transistor ("TFT") "S" is disposed.

The common line 60 has first and second auxiliary common lines 88a and 88b, which are perpendicular to the common line 60 and spaced apart from each other. In addition, a plurality of common electrodes 82 are formed perpendicular to the first and second auxiliary common lines 88a and 88b. The common electrodes 82 and pixel electrodes 86 are alternately arranged.

Across the plurality of common and pixel electrodes 82 and 86, a plurality of chevron-shaped dielectric protrusions 196 are disposed. The plurality of chevron-shaped dielectric protrusions 196 are parallel to and spaced apart from each other. Each chevron-shaped dielectric protrusion 196 is alternately bent at each crossing point with the pixel electrode 86 or common electrode 82 to have a zigzag shape. The chevron-shaped dielectric protrusion 196 serves to distort an electric field induced between the pixel and common electrodes 86 and 82 such that a multi-domain for the liquid crystal molecules 80 is formed. That is to say, first and second liquid crystal portions 80a and 80b are symmetrically aligned with respect to the pixel electrode 86 or common electrode 82, which is centered on therebetween.

Figure 19A:
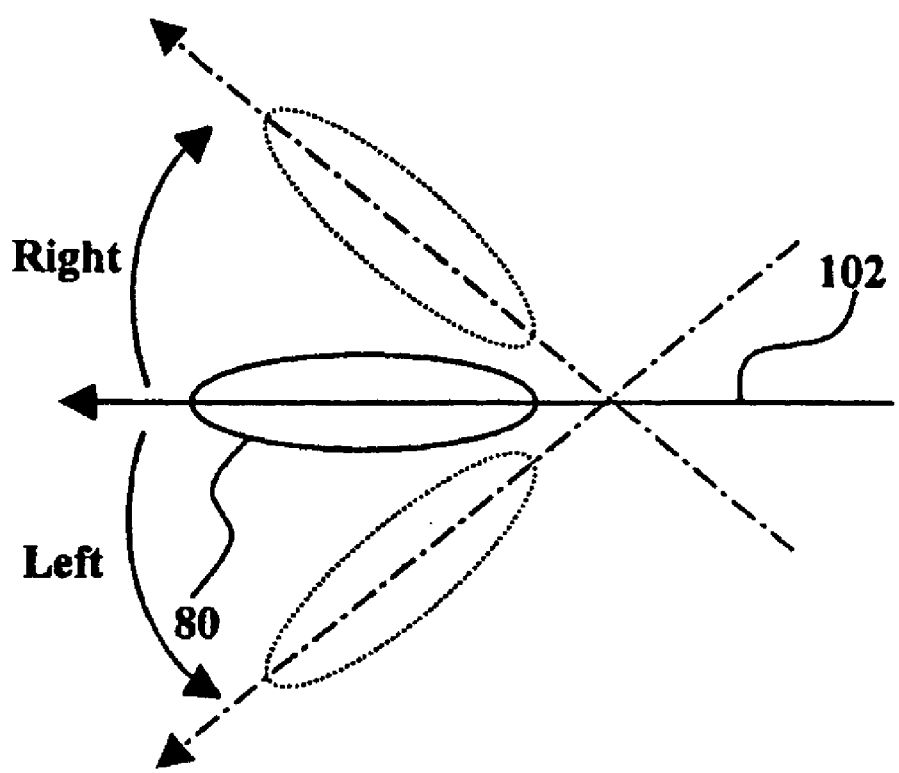
FIGS. 19A and 19B are plan views illustrating alignment characteristics of, respectively, a positive liquid crystal and a negative liquid crystal for the fourth preferred embodiment.
Figure 19B:
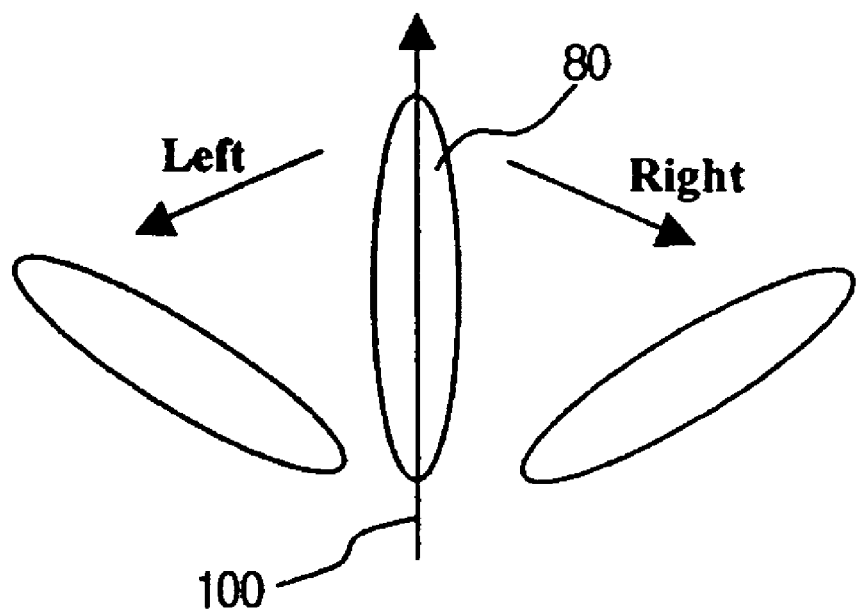

FIG. 19A shows a degree of freedom for liquid crystal molecule 80 with respect to a second rubbing direction 102. In a first state alignment (off state), the liquid crystal molecule 80 is aligned corresponding to the second rubbing direction 102, which is preferably perpendicular to the common and pixel electrodes 82 and 86 of FIG. 18. As shown, the liquid crystal molecule 80 can rotate right or left, which means that the degree of freedom of the liquid crystal molecule 80 is two. On the contrary, the liquid crystal molecules 80 may be a negative liquid crystal instead of the positive liquid crystal. In this case as shown in FIG. 19B, a first rubbing direction 100, which is parallel to the common electrodes 82 and pixel electrodes 86, is used instead of the second rubbing direction 102 of FIG. 19A. The right and left rotating liquid crystal molecules, respectively, are included in first and second domains of the multi-domain.

Fifth Preferred Embodiment

Figure 20:
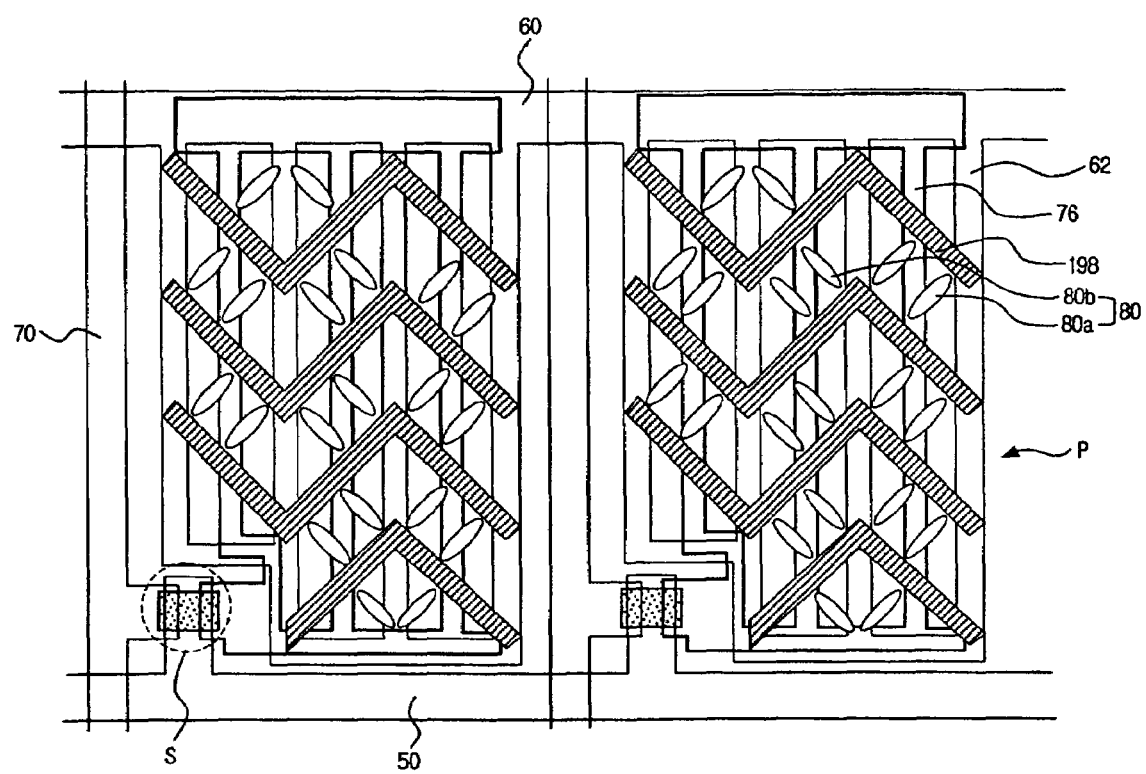
FIG. 20 is a plan view illustrating an IPS-LCD device according to the fifth preferred embodiment.

The fifth preferred embodiment of FIG. 20 is different from the third preferred embodiment of FIG. 15 in that a chevron-shaped dielectric protrusion 198 is alternately bent only at crossing points with a plurality of common electrodes 62. Therefore, in an on state, liquid crystal molecules 80 are divided into first and second liquid crystal portions 80a and 80b with each common electrode 62 centered therebetween. The first and second liquid crystal portions 80a and 80b are rotated, respectively, right and left such that a symmetrical multi-domain is achieved.

At this point, a positive liquid crystal or negative liquid crystal is preferably used as shown in FIGS. 17A and 17B. A detailed description about the positive or negative liquid crystal is omitted.

As previously explained, the first to fifth preferred embodiments adopt a multi-domain, where different domains compensate for each other. To achieve the multi-domain, the first to fifth preferred embodiments use distorted electric fields such that liquid crystal molecules are symmetrically aligned in the various domains.

It will be apparent to those skilled in the art that various modifications and variation can be made in the method of manufacturing a thin film transistor of the present invention without departing from the spirit or scope of the invention. Thus, it is intended that the present invention cover the modifications and variations of this invention provided they come within the scope of the appended claims and their equivalents.

What is claimed is:

1. An IPS-LCD device, comprising:
   first and second substrates opposing each other;
   a gate line on the first substrate;
   a data line perpendicular to the gate line;
   a thin film transistor at a crossing portion between the gate and data lines;
   a common line parallel to the gate line;
   a plurality of common electrodes electrically connected to the common line, wherein the common electrodes are spaced apart from each other and covered by a gate-insulating layer;
   a plurality of pixel electrodes alternately arranged with the plurality of common electrodes, wherein each pixel electrode is spaced apart from an adjacent common electrode and covered by a passivation layer;
   a plurality of dielectric protrusions between the first and second substrates, wherein the dielectric protrusions are chevron-shaped dielectric protrusions that cross the plurality of common and pixel electrodes; and
   a liquid crystal layer between the first and second substrates, wherein the liquid crystal layer and the dielectric protrusion have different dielectric constants.

2. The device of claim 1, wherein the chevron-shaped dielectric protrusions have a zigzag shape extending along a line perpendicular to the common and pixel electrodes.

3. The device of claim 2, wherein the dielectric protrusion is an organic material.

4. The device of claim 3, wherein the organic material is selected from a group consisting of photoresist, benzocyclobutene (BCB), and acryl resin.

5. The device of claim 1, wherein the pixel electrode is selected from a group consisting of indium tin oxide (ITO) and indium zinc oxide (IZO).

6. The device of claim 1, wherein the common electrode is selected from a group consisting of indium tin oxide (ITO) and indium zinc oxide (IZO).

7. An in-plane-switching liquid crystal display panel, comprising:
   first and second substrates opposing each other;
   a gate line on the substrate;
   a data line perpendicular to the gate line;
   a thin film transistor at a crossing portion between the gate and data lines;
   a main common line parallel to the gate line;
   first and second auxiliary common lines perpendicular to the main common line, the first and second auxiliary common lines being parallel to and spaced apart from each other;
   a plurality of common electrodes electrically connected to the first and second auxiliary common lines, the plurality of common electrodes being spaced apart from each other;
   a plurality of pixel electrodes alternately arranged with the plurality of common electrodes, wherein each pixel electrode is spaced apart from an adjacent common electrode;
   a plurality of dielectric protrusions between the first and second substrates; and
   a liquid crystal layer between the first and second substrates.

8. The device of claim 7, wherein the dielectric protrusion has a smaller dielectric constant than the liquid crystal layer.

9. The device of claim 7, wherein the dielectric protrusion has a larger dielectric constant than the liquid crystal layer.

10. The device of claim 7, wherein the dielectric protrusion is an organic material.

11. The device of claim 10, wherein the organic material is selected from a group consisting of photoresist, benzocyclobutene (BCB), and acryl resin.

12. The device of claim 7, wherein a first plurality of dielectric protrusions are disposed over a plurality of pixel electrodes.

13. The device of claim 7, wherein a second plurality of dielectric protrusions are disposed over a plurality of common electrodes.

14. The device of claim 13, wherein the plurality of first and second protrusions are formed on the first substrate having the pixel electrode.

15. The device of claim 13, wherein the plurality of first and second protrusions are formed on the second substrate.

16. The device of claims 12, wherein the plurality of first and second protrusions are formed on the first substrate having the pixel electrodes.

17. The device of claims 12, wherein the plurality of first and second protrusions are formed on the second substrate.

18. The device of claim 7, wherein the dielectric protrusion is a chevron-shaped dielectric protrusion.

19. The device of claim 18, wherein the chevron-shaped dielectric protrusion has a zigzag shape extending along a line perpendicular to the common and pixel electrodes.

20. The device of claim 7, wherein the pixel electrode is selected from a group consisting of indium tin oxide (ITO) and indium zinc oxide (IZO).

21. The device of claim 7, wherein the common electrode is selected from a group consisting of chromium (Cr), aluminum (Al), aluminum alloy (Al alloy), molybdenum (Mo), tantalum (Ta), tungsten (W), antimony (Sb), and an alloy thereof.

22. The device of claim 7, wherein the common electrode is selected from a group consisting of indium tin oxide (ITO) and indium zinc oxide (IZO).

23. The device of claim 7, wherein the liquid crystal layer comprising liquid crystal molecules is a positive liquid crystal having a positive dielectric anisotropy, wherein long axes of liquid crystal molecules are aligned parallel to the common and pixel electrodes in off state.

24. The device of claim 7, wherein the liquid crystal layer comprising liquid crystal molecules is a negative liquid crystal having a negative dielectric anisotropy, wherein long axes of liquid crystal molecules are aligned perpendicular to the common and pixel electrodes in an off state.

* * * * *